United States Patent [19]

Sawada

[11] Patent Number: 5,560,765
[45] Date of Patent: Oct. 1, 1996

[54] HOT-MELT TYPE INK COMPOSITION COMPRISING WAX AND AMIDE(S)

[75] Inventor: Hidemasa Sawada, Gifu, Japan

[73] Assignee: Brother Kogyo Kabushiki Kaisha, Nagoya, Japan

[21] Appl. No.: 515,584

[22] Filed: Aug. 16, 1995

[30] Foreign Application Priority Data

Aug. 30, 1994 [JP] Japan .................. 6-204840

[51] Int. Cl.$^6$ ................................ C09D 11/02
[52] U.S. Cl. .................. 106/22 A; 106/22 H; 106/30 A; 106/31 R
[58] Field of Search ............... 106/22 A, 22 H, 106/30 A, 31 R

[56] References Cited

U.S. PATENT DOCUMENTS

| | | | |
|---|---|---|---|
| 3,653,932 | 4/1972 | Berry et al. | 106/22 A |
| 4,390,369 | 6/1983 | Merritt et al. | 106/31 R |
| 4,758,276 | 7/1988 | Lin et al. | 106/27 R |
| 4,820,346 | 4/1989 | Nowak | 106/22 A |
| 4,822,418 | 4/1989 | Lin et al. | 106/27 R |
| 4,870,118 | 9/1989 | Kinoshita et al. | 523/207 |
| 4,878,946 | 11/1989 | Tabayashi et al. | 106/22 A |
| 5,182,572 | 1/1993 | Merritt et al. | 346/1.1 |
| 5,230,731 | 7/1993 | Kanbayashi et al. | 106/30 R |
| 5,397,388 | 3/1995 | Fujioka | 106/22 A |
| 5,409,530 | 4/1995 | Kanbayashhi et al. | 106/27 R |
| 5,421,868 | 6/1995 | Ayalia-Esquilin et al. | 106/22 A |
| 5,427,611 | 6/1995 | Shirota et al. | 106/22 A |

FOREIGN PATENT DOCUMENTS

| | | |
|---|---|---|
| 62-295973 | 12/1987 | Japan . |
| 2-29471 | 1/1990 | Japan . |
| 5-125316 | 5/1993 | Japan . |

*Primary Examiner*—Helene Klemanski
*Attorney, Agent, or Firm*—Oliff & Berridge

[57] ABSTRACT

A hot-melt type ink composition for use in an ink jetting printing apparatus, which is in a solid phase at room temperature, and is to be liquefied by heating at an elevated temperature above the room temperature so as to effect printing. The ink composition of the invention contains a wax having a melting point in a range of 50° C. to 150° C., a resin, a dye and at least one amide.

6 Claims, 1 Drawing Sheet

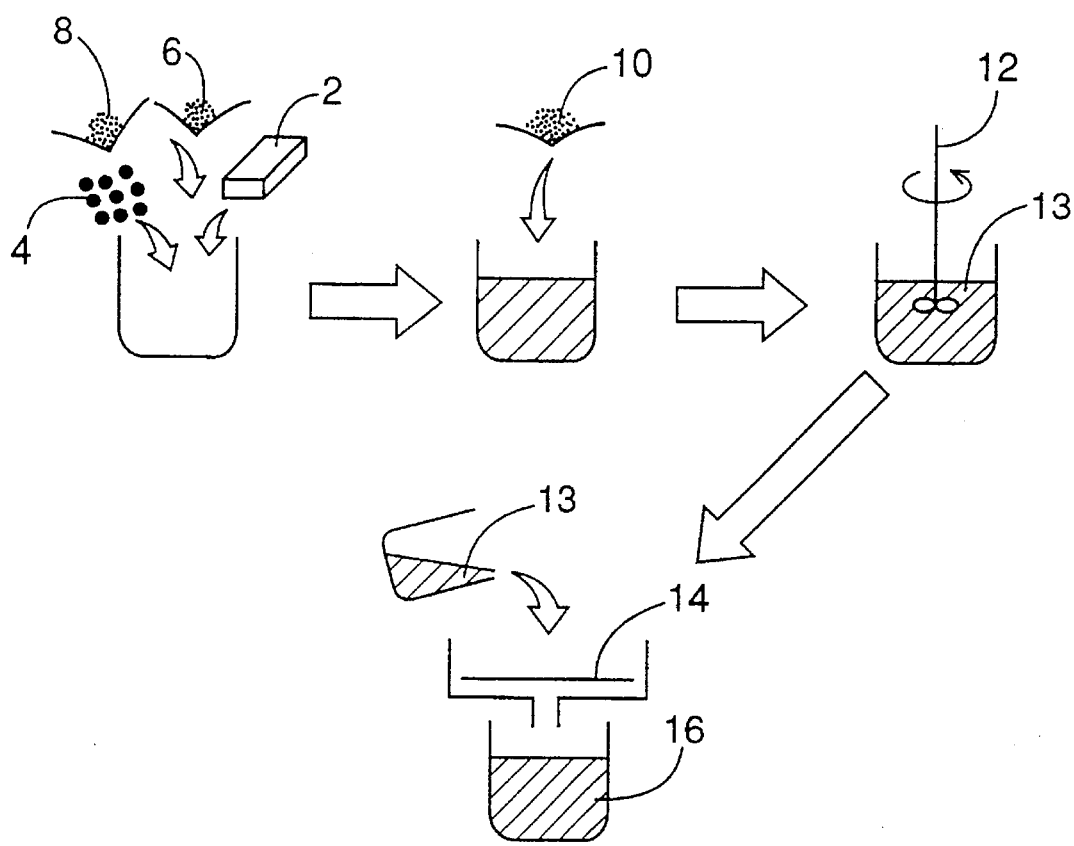

1

HOT-MELT TYPE INK COMPOSITION COMPRISING WAX AND AMIDE(S)

BACKGROUND OF THE INVENTION

1. Field of the Invention

The present invention relates to a hot-melt type ink composition for use in an ink jet printing apparatus, and more particularly to such a hot-melt type ink composition that is to be fused by heating at an elevated temperature above room temperature, and discharged in a liquid phase from the ink jet apparatus, so as to print images on a recording medium.

2. Discussion of Related Art

There have been proposed various ink jet printing methods, which include: electrostatic ink jet printing which utilizes electrostatic force for discharging or ejecting an ink; drop on demand type ink jet printing which utilizes displacement of piezoelectric elements which are energized in response to the application of a pulsed voltage, so as to produce pressure for ejecting the ink; thermal ink jet printing in which the ink is heated to a high temperature to form and develop bubbles, so as to produce pressure for ejecting the ink. These known ink printing methods permit printing of images with a high resolution and good print quality.

Generally, a water-based ink containing water as a major solvent, or an oil-based ink containing an organic solvent is used for the above types of ink jet printing. Print images obtained by the water-based ink generally have poor water-fastness, while print images obtained by the oil-based ink have excellent water-fastness.

However, the known water-based and oil-based inks are usually in a liquid phase at room temperature, and are therefore likely to suffer from blurring of images printed on a recording medium, and insufficient print density. Further, some component of the ink may be deposited or precipitated due to the liquid phase of the ink, resulting in undesirably lowered reliability of the ink jet printing.

In view of the above problems, it is proposed to use a hot-melt type oil-based ink for ink jet printing, which ink is in a solid phase at room temperature. For example, U.S. Pat. No. 3,653,932 discloses an ink composition containing dialkylester sebacate, and U.S. Pat. No. 4,390,369 (corresponding to JP-A-58-108271) discloses an ink composition containing at least one natural wax, while U.S. Pat. No. 4,758,276 (corresponding to JP-A-59-22973) discloses an ink composition containing stearic acid. Further, U.S. Pat. No. 4,822,418 (corresponding to JP-A-61-83268) discloses an ink composition containing an acid or alcohol having from 20 to 40 carbon atoms, and ketone having a relatively high melting point, and U.S. Pat. No. 4,820,346 (corresponding to JP-A-62-48774) discloses an ink containing a thermosetting resin having a high hydroxyl number, a solid organic solvent having a melting point less than 150° C., and a small amount of a dye. U.S. Pat. No. 4,870,118 (corresponding to JP-A-62-112627) discloses an ink having a coloring material, a first solvent which is in a solid phase at room temperature and is liquefied or fused by heating at an elevated temperature above the room temperature, and a second solvent for dissolving the first solvent, which is in a liquid phase at room temperature and has a high volatility. JP-A-62-295973 discloses an ink containing a synthetic wax having polar groups with a dye soluble therein.

on the other hand, JP-A-2-29471 discloses an ink in which a dye is easily dissolved by use of $C_1$ to $C_{22}$ fatty acid amide, while JP-A-5-125316 discloses an ink including a dye-dissolving agent, such as fatty acid or fatty acid amide, having a melting point of 80° C. or higher.

However, the hot-melt inks disclosed in the above publications are not able to meet some basic requirements, such as high clearness or sharpness of colors of images, and high adhesive property of the ink with respect to a recording medium, for example. These hot-melt inks are thus unsatisfactory in the print quality of images obtained therefrom. In particular, the inks are lack of transparency, and thus cannot be used for overhead projectors (OHP).

Further, vehicles of the known hot-melt inks as described above do not have sufficiently high capability of dissolving dyes, that is, cannot dissolve an amount of dye(s) required for providing sharp color images on a paper. The low dissolving capability of the vehicles makes it difficult to produce inks having desired colors. Generally, dyes for cyan blue and black colors have low solubility. Thus, it is difficult to produce inks capable of providing sharp cyan blue and black images.

SUMMARY OF THE INVENTION

It is therefore an object of the present invention to provide a hot-melt type ink composition which meets basic requirements and assures good print quality, and which has transparency and can be used for overhead projectors. It is also an object of the invention to provide such a hot-melt type ink composition having a vehicle which has sufficiently high capability of dissolving a dye or dyes, for providing images having optimum and clear colors.

The above objects may be attained according to the principle of the present invention, which provides a hot-melt type ink composition which is in a solid phase at room temperature, and which includes a wax having a melting point in a range of 50° C. to 150° C., a resin, a dye and at least one amide.

In the hot-melt type ink composition of the present invention as described above, the wax, which is a major component of the ink composition, serves to determine ink characteristics, such as the thermal characteristic and viscosity of the ink. The resin improves an adhesive strength of the ink with respect to a recording medium, and serves to control the viscosity of the ink, prevent crystallization of the wax and provide the ink with a suitable degree of transparency. The ink composition further includes a coloring material in the form of a dye for giving the ink a suitable color. With the amide(s) added to the ink composition of the wax, resin and dye, the ink shows an increased power or capability of dissolving various kinds of dyes, and, when used for printing, provides sharp and clear color images, assuring high print quality. This enables production of a wider variety of inks having colors which were conventionally less visible and clear.

The above-indicated at least one amide may be selected from aromatic amides, and may include at least one kind of aromatic amide.

The above-indicated at least one amide may also be selected from aliphatic amides, and may include at least one kind of aliphatic amide. The aliphatic amide(s) thus selected may be selected from fatty acid amides.

Preferably, the amides contained in the ink composition include at least one kind of saturated fatty acid amide and at least one kind of unsaturated fatty acid amide, so as to achieve further improved dye solubility and clearness of the ink color. The thus obtained ink does not cause clogging in an ink jet print head during its printing operation, and assures good ink jet printing with high print quality.

BRIEF DESCRIPTION OF THE DRAWING

The ensuing detailed description of the present invention refers to the accompanying drawing which is a view illustrating a process of preparing an ink composition according to Example 1.

DETAILED DESCRIPTION OF THE PREFERRED EMBODIMENT

One embodiment of a hot-melt type ink composition of the present invention contains 20–80% by weight of a wax or waxes having a melting point of 50°–150° C., 5–60% by weight of a resin having a weight average molecular weight of 500 or larger, 1–60% by weight of unsaturated fatty acid amide and 1–60% by weight of saturated fatty acid amide as a dye-dissolving agent, and 0.1–10%, preferably, 0.5–8%, more preferably, 0.5–5% by weight of a dye as a coloring material.

The wax used as one component of a vehicle of the ink composition of the instant embodiment has a melting point of 50°–150° C., and should be stable to heat. For example, the wax may be selected from various known waxes which include: petroleum waxes, such as paraffin wax and microcrystalline wax; waxes of vegetable origin, such as candelilla wax, carnauba wax, rice wax, and jojoba wax; waxes of animal origin, such as beeswax, lanolin and spermaceti wax; waxes of mineral origin, such as montan wax; synthetic hydrocarbons, such as Fisher-Tropsch wax and polyethylene wax; hydrogenated waxes, such as hardened castor oil and its derivatives; modified waxes, derivatives of montan wax, paraffin wax, microcrystalline wax and polyethylene wax; higher fatty acids, such as behenic acid, stearic acid, palmitic acid, myristic acid, and lauric acid; higher alcohols, such as stearyl alcohol and behenyl alcohol; hydroxystearic acids, such as 12-hydroxystearic acid and its derivatives; ketones, such as stearone and laurone; amines, such as dodecylamine, tetradecylamine, and octadecylamine; esters, such as methyl stearate, octadecyl stearate, glycerol fatty acid ester, sorbitan fatty acid ester, propylene glycol fatty acid ester, ethylene glycol fatty acid ester, and polyoxyethylene fatty acid ester; polymer waxes, such as a copolymer of $\alpha$-olefin and maleic anhydride.

The present ink composition may include a single wax, or a mixture of two or more kinds of waxes, which may be selected from the above-indicated waxes. The content of the wax(es) is desirably in the range of 20–80% by weight, to achieve desired thermal characteristics of the ink to be produced. If the content of the wax is less than 20% by weight, the characteristics of the other components or additives may predominate, and the melting point of the ink may be undesirably raised or made unstable. In such a case, the ink cannot be fused or liquefied at an operating temperature when it is discharged from an ink jet printing apparatus. However, this is not the case when the other additives are suitably selected so that the melting points of the additives are substantially equal to that of the wax. If the content of the wax exceeds 80% by weight, on the other hand, the ink does not exhibit a sufficiently high melt viscosity, and is less likely to adhere to a printing paper.

The resin used as another component of the vehicle in the present embodiment functions to make the ink adherable to a printing paper, control the viscosity of the ink, and prevent crystallization of the wax. The resin also provides the ink with transparency, and prevents flocculation of the dye(s). Thus, the present ink composition can be advantageously used to effect printing on sheets for overhead projectors (OHP).

The resin is desirably selected so that the weight average molecular weight: Mw of the selected resin is in the range of 500 to 500,000. Most of the resins having the weight average molecular weight M of less than 500 are in a liquid phase at ordinary temperature. If the weight average molecular weight: Mw exceeds 500,000, on the other hand, the resins may be hard or have an excessively high melting point, and thus cannot be used for hot-melt type inks. The weight average molecular weight: Mw of the resin is more desirably in the range of 600–400,000, in view of the thermal characteristics of the ink to be produced, and most desirably in the range of 700–300,000 in view of the operating temperature of a print head used for ink jet printing with the ink. To determine the weight average molecular weight: Mw, the molecular weights of various kinds of resins can be measured by gel permeation chromatography, using a differential refractometer as a detector, or by programmed temperature gas chromatography (PTGC), using a thermal conductivity detector.

The resin is desirably selected from oil-soluble resins, which include: olefinic resins or polyolefin, such as polyethylene, polypropylene, and polyisobutylene; vinyl resins, such as a copolymer of ethylene and vinyl acetate, a copolymer of vinyl chloride and vinyl acetate, polyvinylacetate, and a copolymer of ethylene, vinyl chloride and vinyl acetate; acrylic resins, such as polymethacrylate, polyacrylate, a copolymer of ethylene and ethyl acrylate, and a copolymer of ethylene and methacrylic acid; and phenolic resin, polyurethane, polyamide, polyester, ketone resin, alkyd resin, rosin resin, hydrogenated rosin resin, petroleum resin, hydrogenated petroleum resin, maleic resin, butyral resin, terpene resin, hydrogenated terpene resin, chromanindene resin, and others.

The vehicle of the ink composition may include either a single resin or a mixture of two or more resins, in an amount of 5–60% by weight, in view of the melt viscosity of the ink to be produced. If the content of the resin(s) is less than 5% by weight, the resulting ink may not have sufficiently high melt viscosity, and may suffer from poor transparency. If the content of the resin(s) exceeds 60% by weight, on the other hand, it may become difficult for the ink to be discharged from an ink jet print head at its operating temperature.

The unsaturated fatty acid amide used in the ink composition of the present embodiment may preferably have a structure as represented by the formula (1): $R_1$—CONH—$R_2$, where $R_1$ is an unsaturated or saturated hydrocarbon group, and $R_2$ is an unsaturated or saturated hydrocarbon group or hydrogen group, at least one of $R_1$ and $R_2$ being the unsaturated hydrocarbon group. Alternatively, the unsaturated fatty acid amide may preferably have a structure as represented by the formula (2): $R_1$—CONH—$R_3$—NHCO—$R_2$, where $R_1$, $R_2$ and $R_3$ are unsaturated or saturated hydrocarbon groups, and at least one of $R_1$, $R_2$ and $R_3$ is an unsaturated hydrocarbon group. For example, the unsaturated fatty acid amide may be selected from oleic amide, erucic amide, brassidic amide, oleyl stearic amide, stearyl erucic amide, ethylene-bisoleic amide, and other known amides. Examples of such unsaturated fatty acid amides are FA-AMIDE 0N (available from Kao Corporation, Japan), DAIAMID L-200, and NIKKA AMIDE OP, OS, SE (available from Nippon Kasei Chemical Co., Ltd., Japan). However, the unsaturated fatty acid amide is not limited to those as listed above. The ink composition may include either one or a mixture of two or more kinds of these unsaturated fatty acid amides, preferably in an amount of at least 1% by weight, so that the ink to be produced exhibits sufficiently high dye-dissolving capability. It is also desirable that the content of the unsaturated fatty acid amide(s) in the ink composition be not greater than 60% by weight, so that the ink has sufficiently high flexibility, and provides print images or characters with high durability and abrasion resistance.

The saturated fatty acid amide used in the ink composition of the present embodiment may preferably have a structure as represented by the formula (3): $R_4$—CONH—$R_5$, where $R_4$ is a saturated hydrocarbon group, and $R_5$ is a saturated hydrocarbon group or hydrogen group. Alternatively, the unsaturated fatty acid amide may preferably have a structure as represented by the formula (4): $R_4$—CONH—$R_6$—NHCO—$R_5$, where $R_4$, $R_5$ and $R_6$ are saturated hydrocarbon groups. For example, the saturated fatty acid amide may be selected from palmitic amide, stearic amide, myristic amide, lauric amide, behenic amide, stearyl stearic amide, and behenyl behenic amide, and other known acid amides. Examples of such unsaturated fatty acid amides are FA-AMIDE S (available from Kao Corporation), and NIKKA AMIDE S (available from Nippon Kasei Chemical Co., Ltd.). However, the saturated fatty acid amide is not limited to those as listed above. The ink composition may include either one or a mixture of two or more kinds of these saturated fatty acid amides, preferably in the range of 1 to 60% by weight, for the reasons as described above with respect to the unsaturated fatty acid amides.

Generally, the unsaturated fatty acid amide has higher dye-dissolving capability than the saturated fatty acid amide. However, a mixture of the unsaturated fatty acid amide and the saturated fatty acid amide, when used as a dye solvent of the ink, synergistically provides a higher degree of dye-dissolving power, as compared with a sum of the degrees of dye-dissolving powers of the respective unsaturated and saturated fatty acid amides. In each of Examples No. 1 and No. 2 (which will be described later), one kind of unsaturated fatty acid amide and one kind of saturated fatty acid amide were selected and used. Nevertheless, the amides used in the ink composition of the present invention may be selected from only one of the unsaturated and saturated fatty acid amides, provided the ink exhibits sufficiently high dye-dissolving capability.

The coloring material of the hot-melt type ink composition of the present embodiment may be any one of dyes conventionally used in oil-based ink compositions. Preferably, the coloring material is selected from oil-soluble dyes, such as azo dye, disazo dye, metal complex dye, naphthol dye, anthraquinone dye, indigo dye, carbonium dye, quinoneimine dye, cyanine dye, quinoline dye, nitro dye, nitroso dye, benzoquinone dye, naphthoquinone dye, xanthene dye, phthalocyanine dye, and metallophthalocyanine dye. Two or more kinds of these dyes may be used in combination. The content of the dye(s) in the ink composition of the present embodiment is preferably held in the range of 0.1–10% by weight, in view of the coloring property of the ink. More preferably, the content of the dye in the ink composition is in the range of 0.5–3% by weight, so as to ensure that the dye does not precipitate due to thermal changes of the ink during operation of the ink jet print head.

It will be understood from the above description that the content of the amides is suitably controlled so as to improve the dye-dissolving capability of the ink, whereby the ink does not suffer from precipitation of the dye due to its thermal changes, even when the content of the dye is relatively high. This makes it possible to produce inks having highly visible or sharp colors, such as black or cyan blue, which cannot be conventionally achieved due to a limit to the dye-dissolving capability of the ink. This means that the inclusion of the above-indicated range of the amides may not be desirable depending upon the kind of the dye(s).

EXAMPLE 1

A hot-melt type ink composition according to Example 1 contains as a vehicle a wax that is in a solid phase at room temperature, more specifically, paraffin wax (Paraffin Wax Standard 155, available from Nippon Seiro Co., Ltd., Japan). The ink composition further contains a copolymer of ethylene and vinyl acetate (EVAFLEX 210, available from Du Pont -Mitsui Polychemicals Co., Ltd., Japan) as a resin, erucic amide (DAIAMID L-200, available from Nippon Kasei Chemical Co., Ltd.) as an unsaturated fatty acid amide, and N-stearyl stearic amide (NIKKA AMIDE S, available from Nippon Kasei Chemical Co., Ltd.) as a saturated fatty acid amide. The dye used in the ink composition is an oil-soluble dye, more specifically, C.I. Solvent Black 3 (Oil Black HBB, available from Orient Chemical Industries, Ltd., Japan).

| INK COMPOSITION | |
| --- | --- |
| Paraffin Wax Standard 155 | 70% by weight |
| EVAFLEX 210 | 10% by weight |
| DAIAMID L-200 | 8% by weight |
| NIKKA AMIDE S | 10% by weight |
| Oil Black HBB | 2% by weight |

The hot-melt type ink composition of this example was produced according to the process as illustrated in FIG. 1.

Initially, the wax 2 (Paraffin Wax Standard 155), resin 4 (EVAFLEX 210), unsaturated fatty acid amide 6 (DAIAMID L-200), and the saturated fatty acid amide 8 (NIKKA AMIDE S) were fused by heating at a temperature in the range of 70° C.–250° C., preferably, about 100° C.–200° C., and were then mixed with the dye 10 (Oil Black HBB). The mixture thus obtained was stirred at 200–10,000 rpm, preferably, 500–5,000 rpm, by means of a dissolver 12. The thus prepared ink composition 13 was passed through a 2 μm-mesh filter 14 disposed in a filtration equipment with a heater, available from Advantec Toyo Co., Ltd., Japan. In this manner, the hot-melt type ink 16 of Example 1 was finally obtained.

A few droplets of the ink 16 thus prepared were fused on a slide glass which was heated to 130° C., and a cover glass was placed on the ink droplets on the slide glass and lightly pressed. In this condition, the ink 16 was observed with a transmitted light by means of a microscope "XF-UNR" available from Nikon Corporation, Japan, and no particle was found in the ink 16. This means that the dye, Oil Black HBB, was completely dissolved in the ink composition.

The hot-melt type ink composition of Example 1 as described above was advantageously used in an ink jet printer, so as to print sharp black images or characters on a recording medium, without causing clogging of a print head of the ink jet printer.

EXAMPLE 2

A hot-melt type ink composition according to Example 2 contains as a vehicle a wax that is in a solid phase at room temperature, more specifically, microcrystalline wax (Hi-Mic 2065, available from Nippon Seiro Co., Ltd.). The ink composition further contained hydrogenated petroleum resin (ARKON P-90, available from Arakawa Chemical Industries, Ltd, Japan), N-stearyl erucic amide (NIKKA AMIDE SE, available from Nippon Kasei Chemical Co., Ltd.) as an unsaturated fatty acid amide, stearic amide (FA-AMIDE S, available from Kao Corporation) as a saturated fatty acid amide. The dye used in the ink composition is an oil-soluble dye, more specifically, C.I. Solvent Blue 70 (Neopen Blue 0808, available from BASF Japan, Ltd., Japan).

| INK COMPOSITION | |
| --- | --- |
| Hi-Mic2065 | 30% by weight |
| ARKON P-90 | 53% by weight |
| NIKKA AMIDE SE | 8% by weight |
| FA-AMIDE S | 7% by weight |
| Neopen Blue 808 | 2% by weight |

The hot-melt type ink composition of this example was produced according to the same process as in Example 1.

Initially, the wax (Hi-Mic 2065), resin (ARKON P-90), unsaturated fatty acid amide (NIKKA AMIDE SE), and the saturated fatty acid amide (FA-AMIDE S) were fused by heating at a temperature in the range of 70° C.–250° C., preferably, about 100° C.–200° C., and were then mixed with the dye (Neopen Blue 808). The mixture thus obtained was stirred at 200–10,000 rpm, preferably, 500° C.–5,000 rpm, by means of the dissolver as described above. The thus prepared ink composition was passed through a 2 μm-mesh filter disposed in the filtration equipment with heater (available from Advantec Toyo Co., Ltd.). In this manner, the hot-melt type ink of Example 2 was finally obtained.

A few droplets of the ink thus prepared were fused on a slide glass which was heated to 120° C., and a cover glass was placed on the ink droplets on the slide glass and lightly pressed. In this condition, the ink was observed with a transmitted light by means of a microscope "XF-UNR" available from Nikon Corporation, and no particle was found in the ink. This means that the dye, Neopen Blue 808, was completely dissolved in the ink composition.

The hot-melt type ink composition of Example 2 as described above was also advantageously used in an ink jet printer, so as to print sharp black images or characters on a recording medium, without causing clogging of a print head of the ink jet printer.

Comparative Example 1

A hot-melt type ink according to Comparative Example 1 has an ink composition as indicated below:

| INK COMPOSITION | |
| --- | --- |
| Paraffin Wax Standard 155 | 88% by weight |
| EVAFLEX 210 | 10% by weight |
| Oil Black HBB | 2% by weight |

The hot-melt type ink composition of this comparative example was produced in the following manner.

Initially, the wax (paraffin wax standard 155) and the resin (EVAFLEX 210) were fused by heating in the range of 70° C.–250° C., preferably, about 100° C.–200° C., and were then mixed with the dye (Oil Black HBB). The mixture thus obtained was stirred at, 200–10,000 rpm, preferably, 500–5,000 rpm, by means of the dissolver as described above. The thus prepared ink composition was passed through a 2 μm-mesh filter disposed in the filtration equipment with heater (available from Advantec Toyo Co., Ltd.). In this manner, the hot-melt type ink of Comparative Example 1 was finally obtained.

A few droplets of the ink 16 thus prepared were fused on a slide glass which was heated to 130° C., and a cover glass was placed on the ink droplets on the slide glass and lightly pressed. In this condition, the ink 16 was observed with a transmitted light by means of a microscope "XF-UNR" available from Nikon Corporation, Japan. As a result, there were found coarse particles having a size of 10 μm or larger, which could be considered to appear due to precipitation of the dye after the filtration of the ink composition. Thus, it was confirmed that the dye, Oil Black HBB, was not satisfactorily or fully dissolved in the ink composition of Comparative Example 1.

What is claimed is:

1. A hot-melt ink composition for use in an ink jetting printing apparatus, which is in a solid phase at room temperature, and is to be liquefied by heating at an elevated temperature above the room temperature so as to effect printing, said ink composition comprising a wax having a melting point in a range of 50° C. to 150° C., a resin, a dye, at least one saturated fatty acid amide, and at least one unsaturated fatty acid amide.

2. A hot-melt ink composition according to claim 1 which contains said at least one saturated fatty acid amide in an amount of 1–60% by weight, and said at least one unsaturated fatty acid amide in an amount of 1–60% by weight.

3. A hot-melt ink composition according to claim 1, which contains said wax in an amount of 20–80% by weight.

4. A hot-melt ink composition according to claim 1, which contains said resin in an amount of 5–60% by weight.

5. A hot-melt ink composition according to claim 1, which contains said dye in an amount of 0.1–10% by weight.

6. A hot-melt ink composition according to claim 1, wherein said resin has a weight average molecular weight in a range of 500 to 500,000.

\* \* \* \* \*